United States Patent [19]
Gregg

[11] 3,893,431
[45] July 8, 1975

[54] ROTARY INTERNAL COMBUSTION ENGINE

[76] Inventor: Oscar P. Gregg, 2928 Fort Henery Dr., Kingsport, Tenn. 37664

[22] Filed: Apr. 30, 1973

[21] Appl. No.: 355,341

[52] U.S. Cl. ............................. 123/8.13; 123/8.45
[51] Int. Cl. ............................................ F02b 53/04
[58] Field of Search .......................... 123/8.13, 8.45

[56] References Cited
UNITED STATES PATENTS

| | | | |
|---|---|---|---|
| 810,366 | 1/1906 | Bartoletti | 123/8.13 |
| 3,074,387 | 1/1963 | Geschwewder | 123/8.45 |
| 3,168,078 | 2/1965 | Lamm | 123/8.13 |
| 3,359,954 | 12/1967 | Eiermann et al. | 123/8.45 |
| 3,713,425 | 1/1973 | Satta | 123/8.13 |
| 3,777,721 | 12/1973 | Sawada | 123/8.45 |
| 3,795,228 | 3/1974 | Shimizu | 123/8.45 |

Primary Examiner—C. J. Husar

[57] ABSTRACT

A rotary internal combustion engine in which incoming fuel-air is compressed by high pressure of previous fuel-air combustion, the fuel-air feed rate may be independent of rotor speed, conduit means is provided to convey the high pressure fuel-air combustion gases to the combustion chamber in back of the piston, and wherein the combustion chamber may be continually separated from the exhaust port by means of the pistons.

7 Claims, 13 Drawing Figures

PATENTED JUL 8 1975
3,893,431
SHEET 2
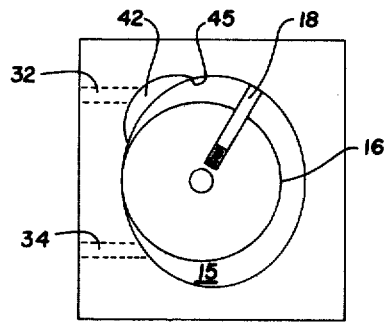
Fig. 7
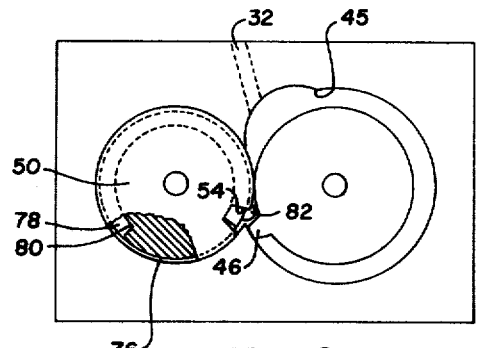
Fig. 8
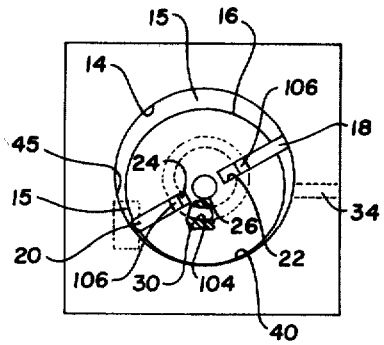
Fig. 11
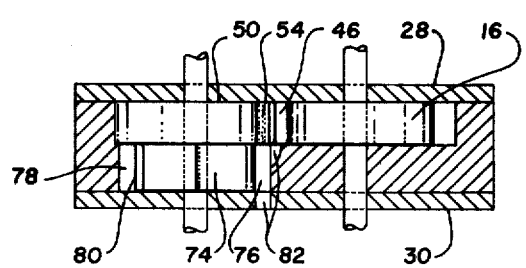
Fig. 9
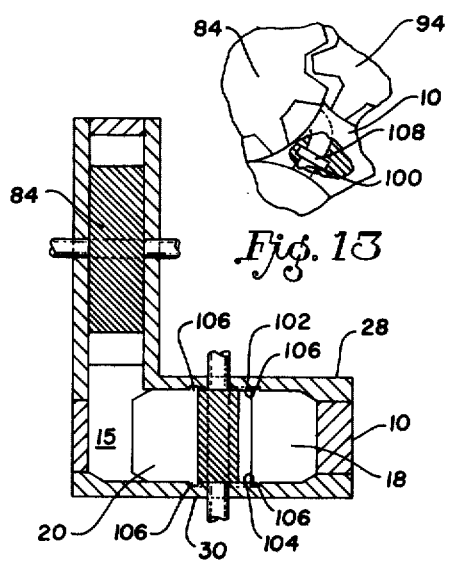
Fig. 13
Fig. 12
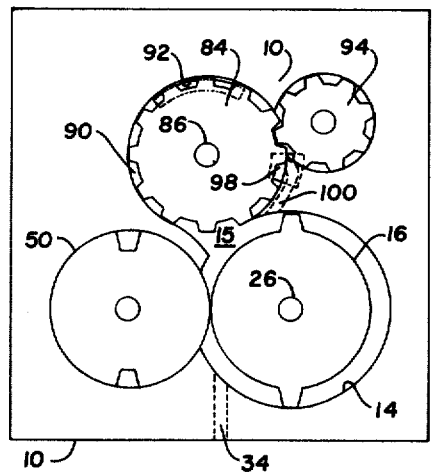
Fig. 10

ROTARY INTERNAL COMBUSTION ENGINE

This invention relates to rotary internal combustion engines wherein structure is provided to allow high pressure gases from previous combustion to pressurize the combustion chamber, and, in another embodiment, to allow fuel-air feed at a rate independent of rotor speed so that, if desired, multiple or prolonged combustion over a wide angle of the rotor cycle may be achieved.

The present invention may be defined in a broad sense as a rotary internal combustion engine comprising rotor means mounted in a cavity formed by internal side wall means of a block and internal end wall means of opposite heads, said rotor means being spaced from said side wall means over at least a substantial portion of its periphery to provide work chamber means, piston means on said rotor means extending outwardly from the periphery thereof to adjacent said side wall means, interrupter means in said side wall means extending into said work chamber means adjacent said rotor and piston means to provide substantially continuous interruption of said work chamber means, exhaust means communicating with said work chamber means, and conduit means connecting angularly spaced portions of said work chamber means. Further, as aforesaid, the fuel-air feed mechanism is such as to feed independently of the rotor speed.

An important object of this invention is to provide a rotary engine having structure which can give a long combustion period to allow more complete combustion of the fuel and result in lower exhaust pollutants. In this regard, the emissions can also be forced through a catalytic converter without interfering with the operation of the engine since the exhaust may be continually sealed from the combustion chamber.

Another object is to provide a rotary engine comprising very simple and rugged construction and having a minimum of moving parts.

A further object is to provide a rotary engine having the capability of autocompression of the fuel-air feed.

These and other objects hereinafter appearing may be more fully visualized through the following description and drawing wherein FIG. 1 is a top view of the rotary engine with the head removed;

FIG. 7 is a top view of another variation of the rotary engine with the head removed;

FIG. 8 is a top view of another variation of the rotary engine with the head removed;

FIG. 9 is a side view of the rotary engine of FIG. 8 with the block broken away;

FIG. 10 is a top view of another variation of the rotary engine with the head removed;

FIG. 11 is a top view of another variation of the rotary engine with the head removed;

FIG. 12 is a side view of the rotary engine of FIG. 11 with the block broken away; and FIG. 13 is a sectional view of a portion of by-pass conduit of FIG. 10 showing a sliding valve.

Figure 1:
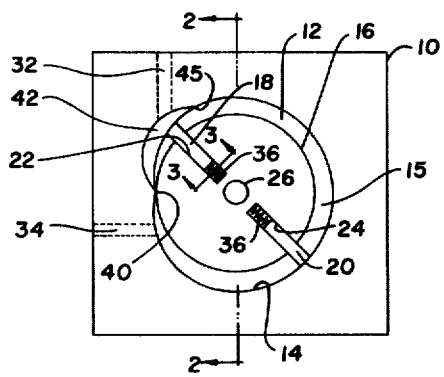
Figure 2:
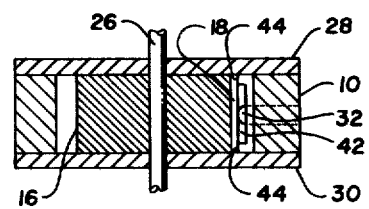
FIG. 2 is a cross-sectional view along line 2—2 of FIG. 1 in the direction of the arrows.
Figure 3:
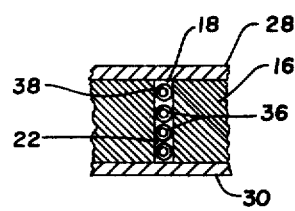
FIG. 3 is an inner end view of the piston of FIG. 1 taken along line 3—3 thereof in the direction of the arrows.

In FIGS. 1 and 2, an embodiment of the invention is shown to comprise a block 10 having a cavity 12 defined in part by an internal side wall 14. A rotor 16 with pistons 18 and 20 slidably mounted in slots 22 and 24 respectively, is rotatably mounted in the cavity by means of shaft 26 suitably journaled in heads 28 and 30 secured to block 10 and completing said cavity. The space between the rotor and the block is generally termed the work chamber 15. A fuel-air feed port 32 and exhaust port 34 are conveniently provided in the block and communicate with work chamber 15. As shown in FIG. 3, the pistons 18 and 20 may be continually urged outwardly in their slots by a mechanism such as coiled compression springs 36 nested in recesses 38 drilled to a suitable size and depth in the inner ends of the pistons or by a cam, provided by grooves in the heads as shown in FIGS. 11 and 12. Such positive outward urging of the pistons is highly desirable as it insures essentially continuous sealing engagement of the outer ends of the pistons with the internal side wall 14. In the embodiment of FIG. 1, interrupter means 40 is provided and is conveniently formed by an inwardly directed portion of block 10. This interrupter is essentially in continuous sliding contact with either rotor 16 or the outer ends of the pistons and essentially discontinues work chamber 15 for a purpose hereinafter described. A conduit 42 of any suitable configuration is conveniently formed in wall 14 and communicates with work chamber 15 and fuel-air port 32. This conduit may, of course, be formed in other ways such as in one or both of the heads. Upper and lower segments 44 of wall 14 bordering conduit 42 provide a convenient stop for the pistons to control their outward projection in the work chamber.

In the operation of the engine just described, fuel and air may be premixed or fed separately in streams, jets or in atomized form in any combustible ratio and pressure through feed port 32 to chamber 15 to the rear of point 45, rotor 16 turning in a clockwise direction for purposes of the present description. Port 32 is shown as communicating with conduit 42, however, it may communicate directly with chamber 15, through, for example, a port in head 28.

Suitable ignition means such as a conventional automotive spark plug and regulatable electrical system may be provided at any suitable location to ignite the fuel-air mixture to the rear of point 45. The electrical sparking system preferably provides the spark at or near the moment that piston 18 moves into sealing contact with point 45 during engine start up. After starting, however, fuel, air and ignition spark may continue to be provided in a substantially continuous manner, or at any desired frequency, or discontinued. It will be seen that when piston 18 moves around to the position of piston 20 of FIG. 1, the high pressure combustion gases in chamber 15 between pistons 18 and 20 will pass through conduit 42 and pressurize the area in back of piston 20 which will have just passed by interrupter 40. The unburned fuel and unused air which passed through conduit 42, and the newly fed fuel and air in back of piston 20 will be ignited in a substantially continuous manner to drive piston 20 in a clockwise direction. It is noted that when the engine is running and fuel, air and spark are being provided continuously or at high frequency, combustion pressure in the work chamber will have negligible effect on reversing the rotor direction as the pistons move past interrupter 40, since the same pressure will bear against the previous or leading piston in a clockwise direction. Also, the clockwise pressure will almost immediately be felt on the back of the pistons passing interrupter 40 by virtue of conduit 42 communicating therewith. Essentially complete exhaust through port 34 is achieved by the compressive or scavenging action of the pistons as they move toward the exhaust port.

Figure 4:
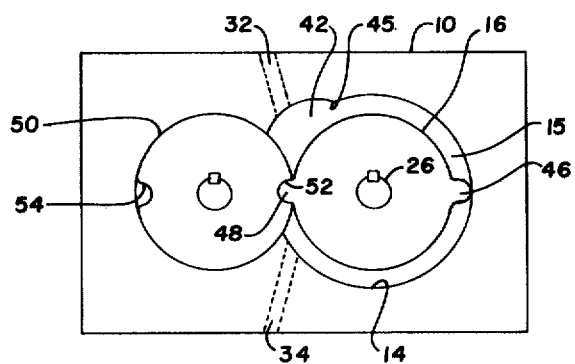
FIG. 4 is a top view of a variation of the rotary engine with the head removed.

In the embodiment shown in FIG. 4, wherein the same numerals are used as in FIG. 1 to denote essentially the same or equivalent structure, pistons 46 and 48 are stationary protuberances, of any convenient configuration, integral with rotor 16. In this embodiment, the interrupter is provided in the form of a rotary seal 50, conveniently rotatably journaled in heads 28 and 30 and provided with recesses 52 and 54 to accommodate pistons 48 and 46 respectively. Seal 50 may be geared by any suitable means such as sprockets and chain to rotate at the speed of rotor 16 in order to allow pistons 46 and 48 to pass. The operation of this embodiment is the same as that of FIG. 1.

Figure 5:
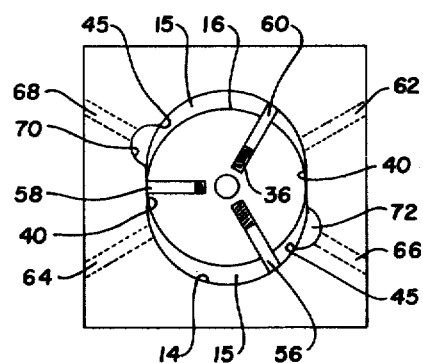
FIG. 5 is a top view of another variation of the rotary engine with the head removed.

In the embodiment shown in FIG. 5, the rotor 16 carries three pistons 56, 58, and 60 of the type of FIG. 1. The inner wall 14 of this embodiment is indented in two places to provide two interrupters 40 rather than the one of FIGS. 1 and 4. Also, two exhaust ports 62 and 64, two fuel-air feed ports 66 and 68, and two conduits 70 and 72 are provided. In the operation of this embodiment which is essentially the same as that of FIGS. 1 and 4, each piston preferably seals off the exhaust port until just after the trailing piston passes by the point 45. This structure allows the full pressure in chamber 15 to pass through conduits 70 and 72 to the back of the trailing piston. This construction also gives multiple combustion phases for each full revolution of the rotor.

Figure 6:
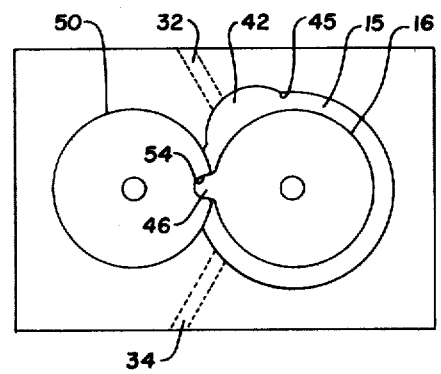
FIG. 6 is a top view of another variation of the rotary engine with the head removed.

In each of the embodiments of FIGS. 1 and 4, for example, a single piston may be employed as shown in FIGS. 6 and 7. In such case the exhaust port 34 would be open for a very short time to chamber 15, that is, until the piston 18 or 46 passed by conduit 42 and sealed against the inner wall 14 at point 45. The resulting diminution in chamber 15 pressure would not be such as to seriously impair the operation of the engine. It is apparent, of course, that any of a variety of valving devices could be employed to close off the exhaust port to chamber 15 until the piston passed on to point 45. One such means is shown in FIGS. 8 and 9 as comprising an exhaust wheel 74 fixed to rotary seal 50 for rotation therewith, an exhaust port closing land 76 on said wheel, an arcuate exhaust conduit 78 formed by recessed shoulder 80 of said wheel, and an exhaust port 82 formed in head 30. It is seen that when piston 46 is in the approximate position shown in FIG. 8, the exhaust port closing land 76 closes off port 82 and keeps it closed until piston 46 gets to point 45 at which time the arcuate exhaust conduit 78 opens exhaust port 82.

In FIG. 10, the engine of FIG. 4 is modified by communicating the fuel-air feed port with a rotary fuel-air feed pump comprising gear-like wheel 84 rotatably mounted on shaft 86 and having teeth 88 providing feed pockets 90. Shaft 86 is connected to a driving means such as an electric motor, the speed of which may be controlled by the operator or by some automatic means responsive to some operating parameter of the engine. A fuel-air inlet 92 is provided, for example, in head 30 and communicates with a source of fuel and air. Rotation of wheel 84 in a counterclockwise direction picks up the charge of fuel-air in pockets 90 and transfers the charge to combustion or work chamber 15. An idler gear 94 rotatably mounted on shaft 96 for close mating with wheel 84 presses gases out of pockets 90 into an auxilliary exhaust port 98. A starting bypass conduit 100 is provided through the housing 10 and communicates with the junction of wheel 84 and idler gear 94 to transfer the starting fuel-air mixture carried out of combustion chamber 15 by pockets 90 back into the combustion chamber during engine start up when auxilliary exhaust port 98 is closed off. After the engine starts, a manually operated sliding or other type valve 108 such as shown in FIG. 13 may be employed to close off conduit 100. During engine operation, when exhaust port 98 is open, the gases may be transferred therefrom back into inlet 92 or to a pollution control device.

In FIGS. 11 and 12 the heads 28 and 30 are provided with camming grooves 102 and 104 respectively, which slidably receive cam follower projections 106 on pistons 18 and 20 to cam the pistons in or out in their slots 22 and 24 to position them in relation to internal side wall 14. In FIG. 12 a variation of a device such as wheel 84 and idler gear 94 of FIG. 10 is shown for the fuel-air feed, and as shown, may be set at a right angle to rotor 16. The feed device feeds into chamber 15 at a point upstream of point 45 as in the other embodiments described herein. The conduit 42 shown in the other embodiments as a groove in wall 14, is present in FIGS. 11 and 12 as the position of the pistons spaced from wall 14 as they move between interrupter 40 and point 45, as a result of the somewhat flattened design of camming grooves 102 and 104 in the arc portion coinciding with the arc between interrupter 40 and point 45.

In each of the embodiments described herein, during engine starting, a load should be placed on rotor 16, preferably by means of a fluid coupling or the like associated with its shaft 26. After suitable starting pressure is developed behind the piston which preferably is held at point 45, a spark may ignite the mixture to start the engine. Any exhaust valves which may communicate with the combustion chamber will be closed during the building of starting pressure.

In the drawings, no seals or gaskets have been shown for the heads, block, rotor, pistons and sealing blades. Also, no shaft bearings and other incidental structure conventionally employed have been shown.

The fuel-air feed system as well as the electrical system for supplying at least initial spark until prior combustion ignites subsequently fed fuel, may be of any of a great variety of well-known constructions. As aforesaid, the fuel and air may be supplied by injection systems which atomize the mixture as it is fed to chamber 15. The rate of feed and the continuity thereof may be controlled automatically according to power demand, semiautomatically, or by response to a physical act of the operator. The electrical sparking system may be similarly controlled.

It is also within the scope of the present invention to provide multiple fuel, air and ignition means progressively positioned along the inner wall 15 and operable to progressively feed fuel and air and ignite the same in back of the pistons as they move through their revolutions.

As previously stated, the exhaust and intake or feed ports are conveniently located in the block, however, an innumerable variety of means may be employed to perform their functions. See, for example, U.S. Pat. Nos. 3,487,816; 3,682,143; 3,624,740; and 3,621,820.

The invention has been described in detail with particular reference to certain preferred embodiments thereof, but it will be understod that variations and modifications may be made without departing from the spirit and scope of the invention.

I claim:

1. A rotary internal combustion engine comprising rotor means mounted in a cavity formed by internal side wall means of a block and internal end wall means of opposite heads, said rotor means being spaced from said side wall means over at least a substantial portion of its periphery to provide work chamber means, piston means on said rotor means adapted to extend outwardly from the periphery thereof to adjacent said side wall means, interrupter means in said side wall means extending into said work chamber means and adapted to remain adjacent to either said rotor means or said piston means to provide substantially continuous interruption of said work chamber means, exhaust means adapted to communicate with said work chamber means, conduit means connecting angularly spaced portions of said work chamber means, and fuel-air feed means for feeding fuel and air to said work chamber means at a rate independent of rotor speed, said conduit means being adapted to communicate simultaneously with said fuel-air feed means and said angularly spaced portions of said work chamber means.

2. The engine of claim 1 wherein said interrupter means comprises at least one inwardly projecting portion of said block.

3. The engine of claim 1 wherein said interrupter means comprises at least one rotatable member having a peripheral surface shaped to accommodate and substantially seal against the rotor during rotor rotation.

4. The engine of claim 1 wherein multiple pistons are provided and said conduit means is spaced downstream from said interrupter means an angular distance less than the angular distance between said pistons.

5. The engine of claim 1 wherein a fuel-air feed mechanism is provided and communicates with the engine work chamber and comprises a rotatable wheel having a plurality of peripherally spaced pockets, said wheel and said pockets being slidably sealed in a housing having a port through which fuel and air are fed progressively to said pockets for transportation into said work chamber.

6. The engine of claim 5 wherein said pockets are formed by generally gear shaped teeth, and wherein a mating idler gear is provided outside of said work chamber and is adapted to mate with said wheel to force from said pockets any gases which are carried out of said work chamber thereby.

7. The engine of claim 6 wherein an auxilliary exhaust port is provided and communicates with the junction area of said wheel and idler gear, a by-pass conduit is provided and communicates with said junction area and said work chamber, and wherein valve means is provided to close off said auxilliary exhaust port during engine starting and to close off said by-pass conduit after the engine has started.

* * * * *